United States Patent [19]

McNulty

[11] E Re. 30,889

[45] Reissued Mar. 30, 1982

[54] OUTER WRAP FOR PIPELINES

[76] Inventor: Frank E. McNulty, R.R. #1, Box 113, Siloam Springs, Ark. 72761

[21] Appl. No.: 4,914

[22] Filed: Jan. 19, 1979

Related U.S. Patent Documents

Reissue of:

[64] Patent No.: 4,014,370
Issued: Mar. 29, 1977
Appl. No.: 615,388
Filed: Sep. 22, 1975

[51] Int. Cl.[3] ..... F16L 9/02; F16L 9/14

[52] U.S. Cl. ..... 138/144; 138/141; 138/145

[58] Field of Search ..... 138/123, 127, 139, 144, 138/145, 129, 132, 124, 125, 140, 141, 143, 147, 131, 153

[56] References Cited

U.S. PATENT DOCUMENTS

| | | | |
|---|---|---|---|
| 427,659 | 5/1890 | Bayles | 138/140 |
| 656,187 | 8/1900 | Gunnell | 138/127 X |
| 1,013,291 | 1/1912 | Gilmore | 138/141 X |
| 1,867,984 | 7/1932 | Pistor | 138/145 |
| 1,994,139 | 3/1935 | MacLachlan | 138/140 X |
| 2,082,175 | 6/1937 | Sutherland | 138/145 |
| 2,291,838 | 8/1942 | Shoan | 138/145 |
| 2,360,109 | 10/1944 | Converse | 138/145 |
| 3,548,883 | 12/1970 | Cohen | 138/143 |
| 3,605,818 | 9/1971 | Balchan | 138/126 |
| 3,918,499 | 11/1975 | Higbee | 138/125 |
| 3,939,874 | 2/1976 | Gray | 138/153 |

FOREIGN PATENT DOCUMENTS

| | | | |
|---|---|---|---|
| 762478 | 4/1933 | France | 138/127 |
| 8135 | of 1897 | United Kingdom | 138/127 |

*Primary Examiner*—James E. Bryant, III

[57] ABSTRACT

Outer wrap for pipelines is made of essentially flat thermoplastic fibers preferably woven in a basket weave pattern with from about 15 to 20 percent of the fabric area being open. On wrapping a pipe freshly coated with coal tar or equivalent material, the wrap does not tend to sink into the coating as is found to be the case with other outer wraps, such as those made from round glass fibers. Because of the ability of the mesh wrap of this invention to eliminate air entrapment during the wrapping operation, an essentially holiday-free coating results. This system also lends itself to uniform distribution of cathodic current over the entire surface. The tough, smooth wrapping does not allow cold flow of coating material through the fabric due to the weight of backfill and tension of the wrap.

9 Claims, 3 Drawing Figures

OUTER WRAP FOR PIPELINES

Matter enclosed in heavy brackets [ ] appears in the original patent but forms no part of this reissue specification; matter printed in italics indicates the additions made by reissue.

This invention relates to outer coverings for pipe or other conduits and in particular pertains to improvements in protective covering for conduits in general adapted to be buried in the soil.

BACKGROUND OF THE INVENTION

In the past, pipes for below-ground installation have been covered with various materials such as fusion-bonded epoxy resin, hot applied coal tar or asphalt, polyethylene, glass cloth, asbestos felt, and cold-applied plastic tapes. Prior to placement of many outer wraps on the pipe, the pipe is coated with a suitable waterproofing material, such as coal tar pitch, asphalt, or wax, and thereafter wrapping the coated pipe with felt, plastic film, or glass cloth. Since bitumens and wax are ordinarily solids at temperatures less than 150° F., they are heated to a readily flowable consistency and usually applied to the pipe by flooding the hot wax or bitumen on to the pipe as it moves horizontally while rotating. The pipe rotation can be mechanically set to rotate one full revolution as the pipe moves horizontally at a rate such that the distance traveled during a single revolution of the pipe is slightly less than the width of the wrapping material, thus causing each adjacent width of the latter to overlap on each revolution. Thus, if a 9-inch-wide wrap is applied, the pipe moves horizontally about 8½ inches for each full revolution, providing an overlap of about ½ inch.

Once the thus coated and wrapped pipe is buried in the ground, it generally is further protected by impressing a current thereon to prevent corrosion where defects or holidays exist in the coating. These gaps or holidays in the coating are caused by imperfect application of the coating or damage to the coating and wrapping material during installation. One method of protecting such pipe in place involves the use of a suitable sacrificial anode or rectifier operated anode. Such systems reverse electron flow from the exposed portion of the pipe to the latter from the anode.

Prior to backfilling, the coatings and wrappings are tested for holidays with a high-voltage detector. This generally is set between 7,000 to 20,000 volts and operated at low amperage to prevent breakdown of the coating. The voltage varies according to coating thickness. In the event a holiday or void exists in the coating, the voltage has sufficient potential to develop a spark between the charged detector ring on the outside of the pipe and the pipe surface. The voltage has to be set at a level that will develop a spark which will be at least the applied coating thickness.

Pipe coverings or outer wraps, such as asbestos felt, to aid in inhibiting corrosion of buried pipe, have been used for more than 50 years. More recently, glass cloth and plastic film have been employed. The felt-wrapped coating has the disadvantage that the soil becomes firmly bonded to it. Movement of the pipe or settling of the backfill splits and buckles the protective covering since the hot-applied bitumens are more firmly bonded to the inner surface of the felt than to the pipe. This has caused extensive failure of felt on the top side due to backfill settlement. Felt-wrapped pipe has also failed badly in areas where excessive wet and dry cycles occur, particularly in the Gulf Coast region, and in irrigated areas where the ground is alternately very wet and very dry.

In the case of glass cloth, the round glass fibers cold-flow into the enamel coating causing the coating to extrude outwardly through the cloth, although it does prevent mechanical damage to the coating. Tests and field observations conducted by pipeline companies on tar coatings wrapped with glass cloth show the flow of the tar through this type of wrapper. Such flowthrough is due to the round shape of the glass fibers which cut into the soil-pressured tar and extrude it outside of the glass fibers. Therefore, round glass fibers do not function effectively as a reinforcing material unless covered by a plastic film.

Hot-applied coatings wrapped with polyethylene film are not affected by soil attachment and the underlying coating is not split or moved substantially by the backfill. However, in the event of a holiday in the coating under the film, the latter can prevent the holiday-inspection equipment from functioning properly as the dielectric of the film itself prevents the spark from traveling through the film into the pipe through the holiday. Also, the film creates a high-dielectric shield that can interfere with the current flow from the impressed cathodic protection anode. This is of particular concern in the long-term operation of the pipeline. Efficient cathodic protection requires the current to flow uniformly to the entire pipe surface and not to be impeded by a high-dielectric wrap covering the pipe and possibly a holiday in the coating. Such shielded holidays are not adequately protected by the impressed current.

SUMMARY OF THE INVENTION

Briefly, the present invention comprises the combination of a metal conduit, coated with a cold flowable, adherent, waterproofing layer, e.g., hot-applied coal tar or asphalt, wrapped on the outside with a woven plastic mesh material. While the latter can be made from a variety of thermoplastic resins having the necessary resistance to heat at the time of application, polyethylene or polypropylene are generally preferred. The fibers used in weaving should be flat rather than round, as is the case with the fibers used in glass cloth. With the mesh wrap used in manufacturing the wrapped pipe of my invention, the fibers are close together to give a substantially uniform wrap generally having not more than from about 15 to 20 percent of said surface open or porous, leaving a tough, smooth plastic wrapping on the outside of the coating material, snugly covering said material but not embedded therein. The essentially flat fibers forming the outer wrap should be spaced sufficiently close to prevent the coating from extruding out through the mesh openings due to the weight of the backfill and the tension of the wrap from the application process or cold-flowing through the openings in the mesh. The mechanical strength of the woven mesh of this invention is much stronger than the felt or continuous film, both from the standpoint of tensile strength and tear strength where felt or plastic film have been commercially used in similar applications.

DRAWINGS AND DETAILED DESCRIPTION OF THE INVENTION

Figure 1:
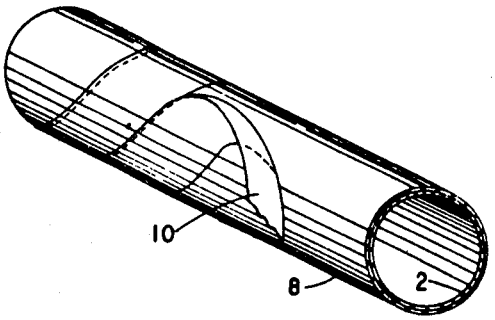
FIG. 1 is an elevational view of pipe having a protective wrapper embodying the features of this invention.
Figure 2:
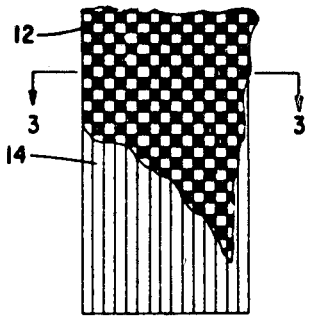
FIG. 2 is an enlarged fragmentary view of the flat-fibered plastic mesh employed as the outer wrap for coated pipe contemplated by my invention and demonstrates the application of a basket-type weave.
Figure 3:
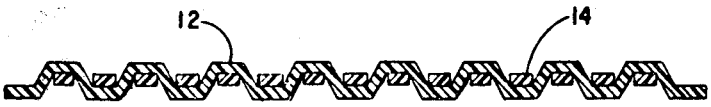
FIG. 3 is a cross sectional view taken along line 3—3 illustrating the relative width, thickness and spacing of the fibers making up the mesh outer wrap.

Referring again to FIG. 1, 2 is a length of metal pipe covered with a coating of waterproofing material 8, such as coal tar, petroleum wax, or the like. Over the latter is a strip of protective wrapper 10, wound in overlapping spiral fashion. The structure of wrapper 10 is shown in detail in FIG. 3 with the flat fibers formed in a basket weave configuration. Horizontal and vertical fibers 12 and 14, respectively, may be of the same or different material, the important requirement being that they are essentially flat. Typically, the dimensions of fibers 12 and 14 may range from about 1/32 to about 1/10 inch in width, and from about 0.003 inch to about 0.005 inch in thickness. The spacing between parallel fibers 12 is essentially the same as the spacing between fibers 14 shown in FIG. 3. Preferred dimensions are generally 1/16 inch in width, 0.004 inch in thickness, with 15 of such fibers to the inch, both vertically and horizontally. The fibers of my outer wrap, being essentially flat, do not pull into the hot-applied coating as the more loosely woven glass cloth made from round fibers. In this connection, glass cloth used for outer wrapping material is made of round fibers approximately 1/64 inch in diameter and 20 fibers to the inch horizontally and vertically.

The fibers employed in my invention preferably are pigmented with carbon black to resist deterioration by exposure to ultraviolet light of the sun during application and construction prior to backfilling, since the wrapped pipe is frequently exposed to the weather up to several months before it is placed and backfilled.

A further advantage of the woven mesh wrap of the present invention is that during the application thereof onto the coating of hot-applied tar, or the like, air can escape over the entire surface area of the wrap as it is applied to the hot coating. Both felt and continuous film as they are nonporous, tend to trap air between the wrap and the enamel, causing holidays during application. If either the felt or the film is perforated substantially to permit the air to escape, the perforations weaken the material mechanically. The ability of the air to pass through the openings in the mesh wrap overcomes this problem. The woven mesh provided by my invention, while porous, has a high percentage of surface area comprising flat, plastic film fibers. These flat fibers are able to resist backfill damage during the construction operation. The plastic surface area should cover at least 80 percent of the pipe surface to be effective. Otherwise, the waterproofing element can be forced by ground pressure to extrude through the porous covering where the openings therein are of relatively large magnitude. The flat fibers act as a continuous plastic film to resist soil damage to the coating and will also pass current uniformly over the wrapped coating surface.

A still further advantage of the mesh of this invention is that greater than normal tension can be applied to the wrapper without forcing the enamel through the openings between the flat fibers. As the fibers are flat, they do not sink into the hot coating but remain on the surface. The tension is adequate to expel the air between the coating and the wrap that is frequently entrapped due to speed of the coating and wrapping procedure. Outer wrappers of round fibers, such as glass or plastic threads, do not readily remain on the surface if applied with sufficient tension to expel the air.

It is to be understood that other variations or modifications of my invention and those described above will be apparent to those skilled in this field without departing from the basic concept of my invention, i.e., the use of a fabric outer wrap made from essentially flat fibers and spaced apart from one another such that the porosity or open area of the wrap represents not more than about 20 percent.

I claim:

[1. The combination comprising a section of metal conduit coated with a layer of a cold flowable, adherent, waterproofing material over which is wound a continuous strip of a porous fabric woven of essentially flat thermoplastic fibers, said fabric having substantially uniform openings that provide approximately 15 to 20 percent of the total area of said fabric.]

[2. The combination of claim 1 in which the dimensions of said fibers range from about 1/32 to about 1/10 inch and have a thickness of from about 0.003 inch to about 0.005 inch.]

[3. The combination of claim 1 in which said porous fabric is overlapping and spirally wound about the coating on said conduit.]

[4. The combination of claim 1 wherein said fibers are about 1/16 inch wide and about 0.004 inch thick.]

[5. The combination of claim 1 in which the width of said fibers is such that there are approximately 15 per inch.]

[6. The combination of claim 1 wherein said fabric is in the form of a basket weave.]

[7. The combination of claim 1 wherein said waterproofing material is selected from the group consisting of coal tar, asphalt, and petroleum wax.]

[8. The combination of claim 1 wherein said fibers are made of a resin selected from the group consisting of polyethylene, polypropylene, vinyl chloride and vinylidine chloride.]

[9. The combination of claim 1 wherein said porous fabric is wound on said metal conduit and in direct contact with said water-proofing material.]

[10. The combination of claim 1 in which the fibers employed are made of polypropylene.]

*11. The combination consisting essentially of a section of metal conduit coated with a layer of cold flowable, adherent, waterproofing material over which and in direct contact with said material is wound a continuous strip of a fabric wrap woven of essentially flat thermal plastic fibers and having a porosity of not more than about 20% whereby the fibers of said wrap do not sink into said material and are sufficiently close to prevent said material from extruding through due to tension of said wrap from the application process or cold flowing through the openings in the said fabric, said tension being adequate to expell air between said material and wrap that is frequently entrapped due to the speed of the coating and wrapping procedure.*

*12. The combination of claim 11 in which the dimensions of said fibers range from about 1/32 to about 1/10 inch in width and have a thickness of from about 0.003 inch to 0.005 inch.*

*13. The combination of claim 11 wherein said fibers are about 1/16-inch wide and about 0.004-inch thick.*

*14. The combination of claim 11 in which the width of said fibers is such that there are approximately 15 per inch.*

*15. The combination of claim 11 wherein said water-proofing material is selected from the group consisting of coal tar, asphalt, and petroleum wax.*

*16. The combination of claim 11 wherein said fibers are made of a resin selected from the group consisting of polypropylene, polyethylene, vinyl chloride and vinylidine chloride.*

*17. The combination of claim 11 wherein said wrap is wound on said metal conduit and in direct contact with said water-proofing material.*

*18. The combination of claim 11 in which the fibers employed are made of polypropylene.*

*19. The combination of claim 11 in which the fibers employed are made of polyethylene.*

* * * * *